United States Patent [19]

Wereb

[11] 4,199,036

[45] Apr. 22, 1980

[54] WHEEL CHAIR

[75] Inventor: John A. Wereb, Lyndhurst, Ohio

[73] Assignee: Instrument Components Co., Inc., Mentor, Ohio

[21] Appl. No.: 703,106

[22] Filed: Jul. 6, 1976

[51] Int. Cl.[2] .............................................. B62D 11/06

[52] U.S. Cl. .............................. 180/6.5; 180/DIG. 3; 280/242 WC

[58] Field of Search .............. 180/6.5, 60, 65 R, 64 R, 180/64 M, 11, 15, DIG. 3; 248/16; 280/242 WC

[56] References Cited

U.S. PATENT DOCUMENTS

| | | | |
|---|---|---|---|
| 3,064,744 | 11/1962 | Jennings | 180/6.5 |
| 3,351,148 | 11/1967 | Solomon | 180/65 R X |
| 3,802,524 | 4/1974 | Seidel | 180/6.5 |
| 3,945,449 | 3/1976 | Ostroiv | 180/6.5 |

*Primary Examiner*—Joseph F. Peters, Jr.
*Assistant Examiner*—Randall A. Schrecengost
*Attorney, Agent, or Firm*—Pearne, Gordon, Sessions

[57] ABSTRACT

A collapsible portable manual wheel chair is converted to a collapsible electric wheel chair. The two large rear wheels of the collapsible manual wheel chair are removed, and an electromechanical drive unit is substituted in their place. The drive unit includes a left drive wheel assembly, a right drive wheel assembly, a battery mounting assembly, and a control device supplying electric power to each of the drive wheel assemblies for propelling and steering the wheel chair. The left and right drive wheel assemblies and the battery carrier assembly are each manually removable from the wheel chair frame to permit collapsing the wheel chair frame and are each manually removable from one another to provide portable light weight components.

20 Claims, 7 Drawing Figures

WHEEL CHAIR

BACKGROUND AND SUMMARY OF THE INVENTION

The present invention relates to electrically powered wheel chairs and to a device and a method for converting a collapsible portable manual wheel chair to a collapsible portable electrically powered wheel chair.

Prior art devices and methods for converting portable manual wheel chairs to electric wheel chairs are shown in U.S. Pat. Nos. 3,351,148, 3,893,529, and 3,896,891. These prior art devices and methods typically include electric motor powered drive shafts which drive the conventional large rear wheels of the wheel chair to propel and steer the wheel chair.

The prior art has also provided a wide variety of power wheel chairs such as shown in U.S. Pat. Nos. 3,376,944, 3,749,192 and 3,807,520. These power wheel chairs are typically not usable as portable wheel chairs, since they are not adapted to be readily taken apart and collapsed manually in a short time period without the use of tools. This disadvantage limits the use of such electric wheel chairs, since they are not satisfactory for persons who want an electric wheel chair which may be readily manually collapsed and transported by automobile.

The present invention departs from these and other prior art devices and methods by providing a device and a method for converting a collapsible portable manual wheel chair to a collapsible portable power wheel chair without relying upon use of the large rear wheels of the manual wheel chair. According to the present invention, the large rear wheels of the manual wheel chair are removed and replaced with a collapsible portable electric drive unit which does not materially detract from the portability of the wheel chair. This is accomplished by providing a drive unit which includes a left drive wheel assembly, a right drive wheel assembly, a center battery carrier assembly, and a control device. The left and right drive wheel assemblies each include a ground engaging drive wheel and an electric motor drivingly connected to the wheel.

The left and right drive wheel assemblies are each removably connected to the center battery carrier assembly. The left and right drive wheel assemblies and the battery carrier assembly are then removably connected to the wheel chair, and the control device is mounted on the wheel chair and is electrically connected to the left and right drive wheel assemblies.

When the converted electric wheel chair is to be collapsed such as for transportation by an automobile, the left and right drive wheel assemblies and the center battery carrier assembly are manually disconnected from the wheel chair frame. The wheel chair frame is then collapsed, and, since the large rear wheels of the wheel chair are removed, the collapsed electric wheel chair frame is smaller in size than the original manual collapsed wheel chair frame. The left and right drive wheel assemblies are then each manually disconnected from the battery carrier assembly and from one another. This results in three portable light weight assemblies which can easily be placed in the trunk of an automobile or in any other carrier for convenient transportation.

BRIEF DESCRIPTION OF THE DRAWINGS

These and other features and advantages of the invention will be more readily apparent upon an understanding of the preferred embodiment of the invention shown in the accompanying drawings, wherein.

DETAILED DESCRIPTION OF THE DRAWINGS

Figure 1:
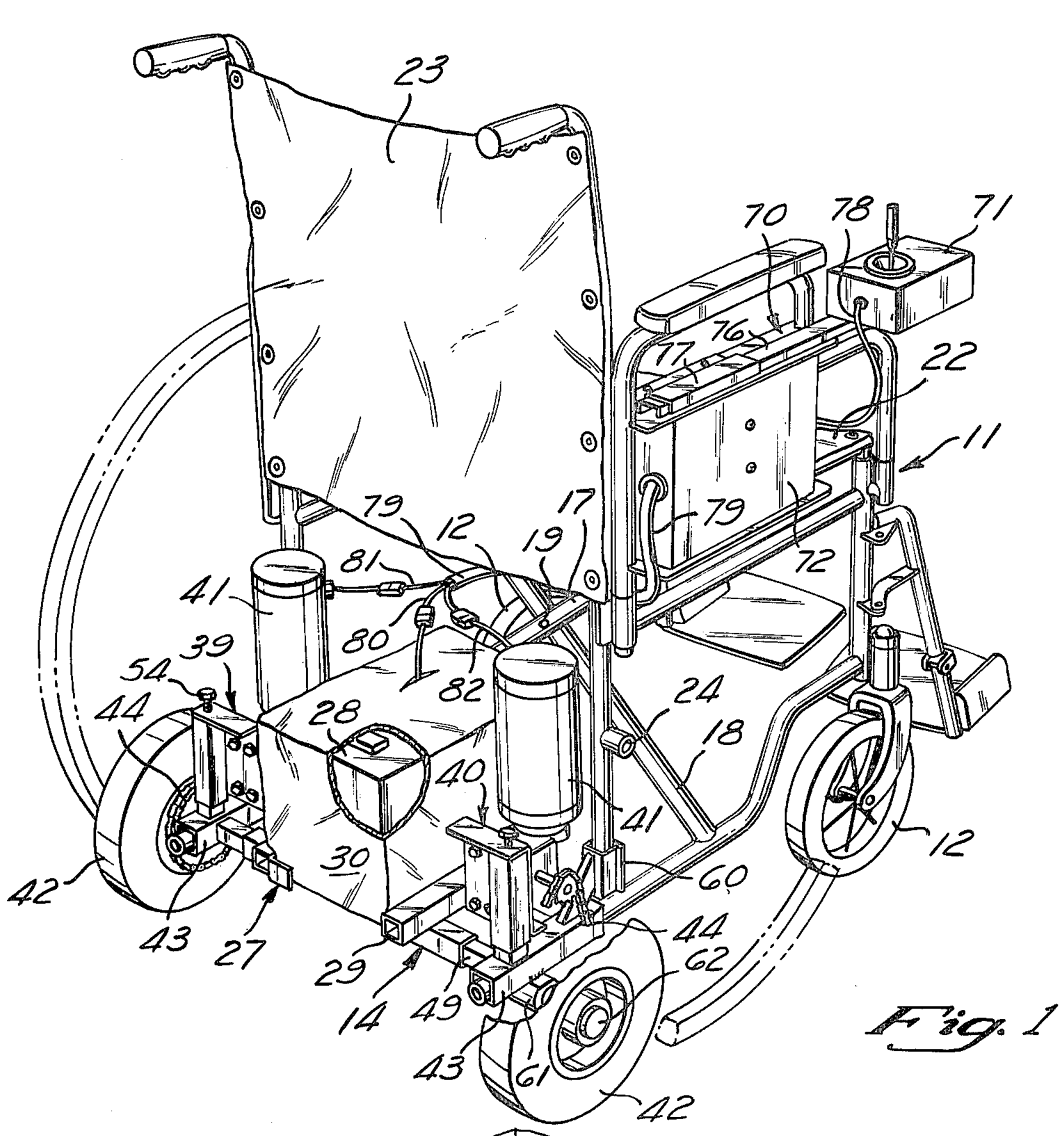
FIG. 1 is a perspective view of a collapsible portable electric wheel chair illustrating the device and method of the present invention.

Referring now to the drawings in greater detail, FIG. 1 shows a collapsible portable manual wheel chair which has been converted to a collapsible portable electric wheel chair. The electric wheel chair shown in FIG. 1 includes a collapsible frame 11, two identical front wheels 12, and an electromechanical drive unit 14.

The collapsible frame 11 is of tubular stainless steel and includes a generally flat right side and a generally flat left side which are mirror images of one another and which are interconnected by two diagonal cross members 17 and 18. The diagonal cross members 17 and 18 are joined at their intersection by a pivot pin 19 and are arranged so that they may be folded together about the pivot pin 19 to reduce the size or bulk of the frame 11 in the manner shown in U.S. Pat. No. 3,064,744, which is incorporated herein by reference.

The collapsible frame 11 also includes a seat 22 and a back 23, each of which is secured to the generally flat left side portion and to the generally flat right side portion of the frame 11. The seat 22 and back 23 are of a suitable foldable material such as vinyl which is capable of supporting the weight of a person who uses the chair and which is folded when the frame 11 is collapsed about the pivot pin 19. The left and right side portions of the frame 11 also include suitable foot rests, each of which is collapsible by being folded about an axis so as to be movable from the position shown in FIG. 1 to a position in which it is disposed in a vertical plane substantially coplanar with the remaining portions of the left and right side portions of the frame 11. A rear wheel axle carrier 24 (only one of which may be seen in FIG. 1) is located on each of the left and right side portions of the frame 11 for rotatably supporting the two large rear wheels of the original manual wheel chair (shown in phantom in FIG. 1) as explained more fully below. Each of the front wheels 12 includes a yoke member (only one of which may be seen in FIG. 1) which is pivotally mounted about a vertical axis on the frame 11.

Figure 2:
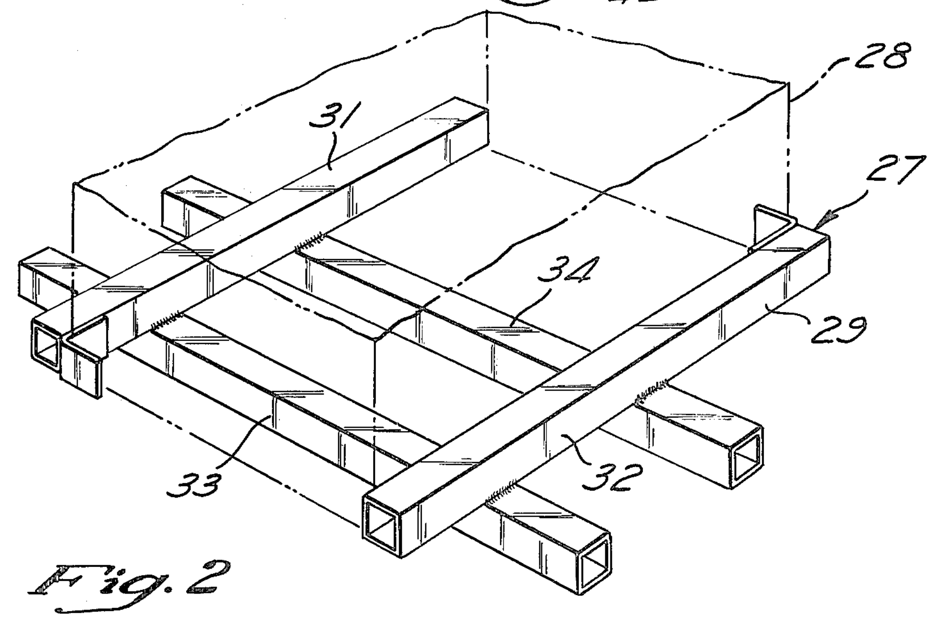
FIG. 2 is an enlarged perspective view of a battery carrier assembly shown in FIG. 1.
Figure 3:
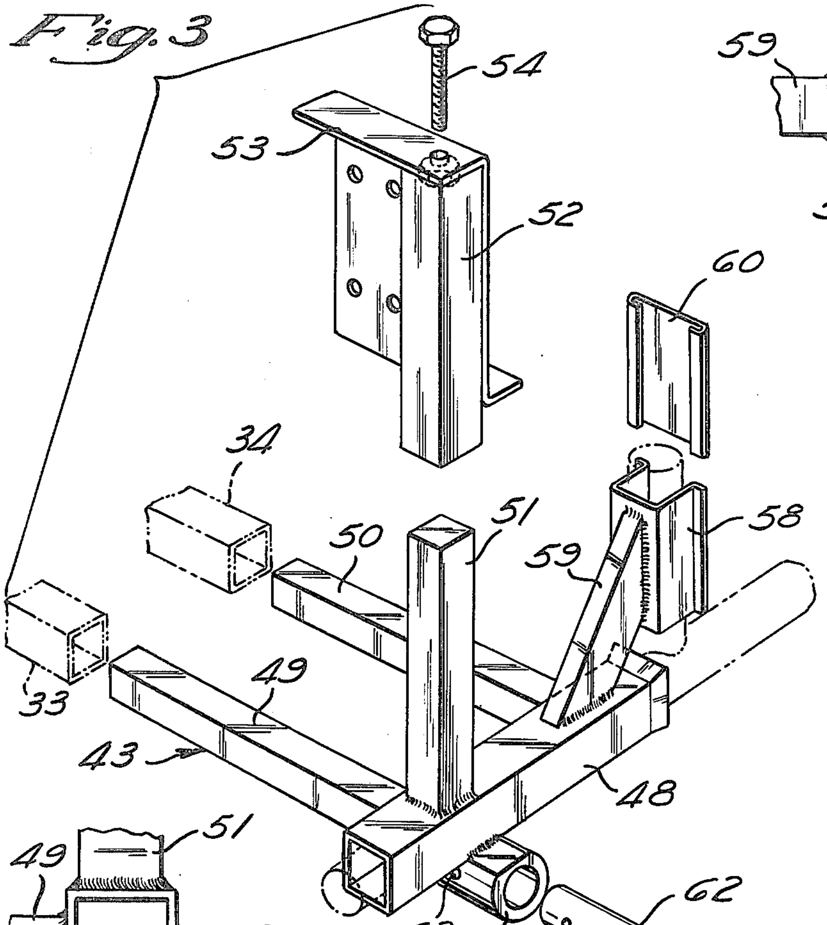
FIG. 3 is an exploded perspective view of a right drive wheel assembly weldment shown in FIG. 1.

Referring now to FIGS. 1 and 2 together, the electromechanical drive unit 14 includes a center battery carrier assembly 27. The battery carrier assembly 27 includes a battery 28, a weldment 29, and a vinyl battery cover 30. In the preferred embodiment, the battery 28 is a 24 volt lead acid storage battery and provides sufficient capacity to drive the electric wheel chair for a full day between charges. The vinyl cover 30 is placed over the battery 28 for appearance purposes. The weldment 29 includes two axially extending square steel tubes 31 and 32 and two laterally extending square steel tubes 33 and 34 which are welded together. The weldment 29 also includes an L-shaped end tab welded on each end of the longitudinally extending square tubes 31 and 32. The battery 28 rests on the laterally extending square tubes 33 and 34 and is secured against lateral or longitudinal movement by the L-shaped tabs and by the longitudinally extending square tubes.

Referring now to FIGS. 1 and 3–6 together, the electromechanical drive unit 14 also includes a left drive wheel assembly 39 and a right drive wheel assembly 40. The drive wheel assemblies 39 and 40 are mirror images of one another and include an electric motor and gear box 41, a ground engaging drive wheel 42, a weldment 43, and a drive chain 44 which extends between a sprocket on the output shaft of the electric motor and gear box 41 and a sprocket which is secured to the drive wheel 42 for rotation therewith.

Each motor and gear box 41 in the preferred embodiment includes a 24 volt D.C. permanent magnet electric motor which drives an output shaft through a worm gear. Each motor and gear box 41 is connected to its associated weldment 43 by four bolts.

Figure 4:
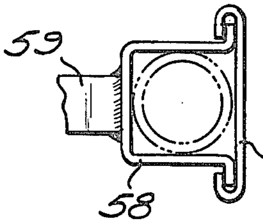
FIG. 4 is a top plan view of a portion of the weldment shown in FIG. 3.
Figure 5:
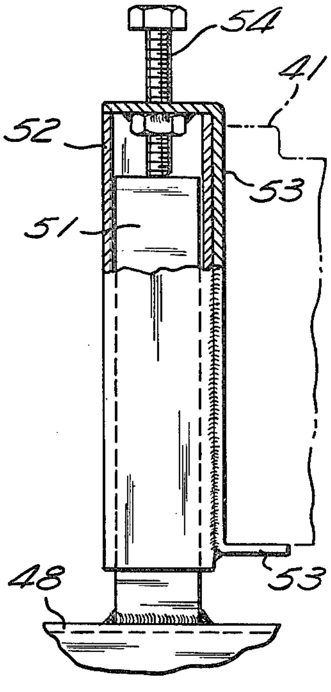
FIG. 5 is a cross sectional side elevational view of a portion of the weldment shown in FIG. 3.
Figure 6:
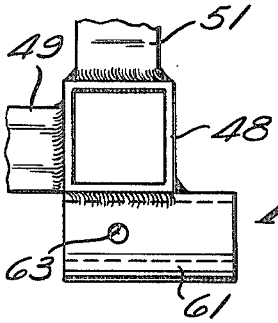
FIG. 6 is a rear view of a portion of the weldment shown in FIG. 3.

Referring still to FIGS. 1 and 3–6, each weldment 43 includes a single longitudinally extending square tube member 48 having its forward end tapered outwardly. Two laterally extending square tube members 49 and 50 are welded to the longitudinal member 48 and extend laterally in a direction toward the center of the wheel chair. A vertically upwardly extending stationary motor mounting post 51, which may also be a square tube having its upwardly facing end closed by a suitable square metal plate, is welded to the top surface of the longitudinal member 48. A slidable motor mounting post 52, which is also a square steel tube, is slidably mounted over the stationary post 51. A motor mounting plate 53 is welded to the slidable post 52 and includes four holes which receive the four bolts described above which secure the electric motor and gear box 41 to the weldment 43. A suitable hole is provided in the top of the motor mounting plate 53 adjacent the post 52, and a suitable nut is welded in alignment with the hole for receiving a bolt 54. The bottom end of the bolt 54 engages the top of the motor mounting post 51 as shown in FIG. 5 so that adjustment of the bolt 54 raises and lowers the slidable motor mounting post 52 and plate 53. In this manner, the bolt 54 raises and lowers the motor and gear box 41 to permit adjusting the tension on the chain 44.

A generally U-shaped reinforcing and connecting plate 58 is weldably secured to the tube 48 by a gusset plate 59. A fastening plate 60 is operatively associated with the reinforcing and connecting plate 58 as best shown in FIGS. 1 and 4. A short length of cylindrical steel tubing 61 is welded to the bottom of the tube 48 to provide an axle carrier. An axle 62 is received in the axle carrier 61 and is held in place by a suitable pin (not shown) which extends through a hole 63 in the axle carrier 61 and through a suitable aligned hole (FIG. 3) in the axle 62. The wheel 42 is rotatably journaled on the axle 62 and is locked against lateral movement by the right end face of the axle carrier 61 and by the enlarged head of the axle 62.

Figure 7:
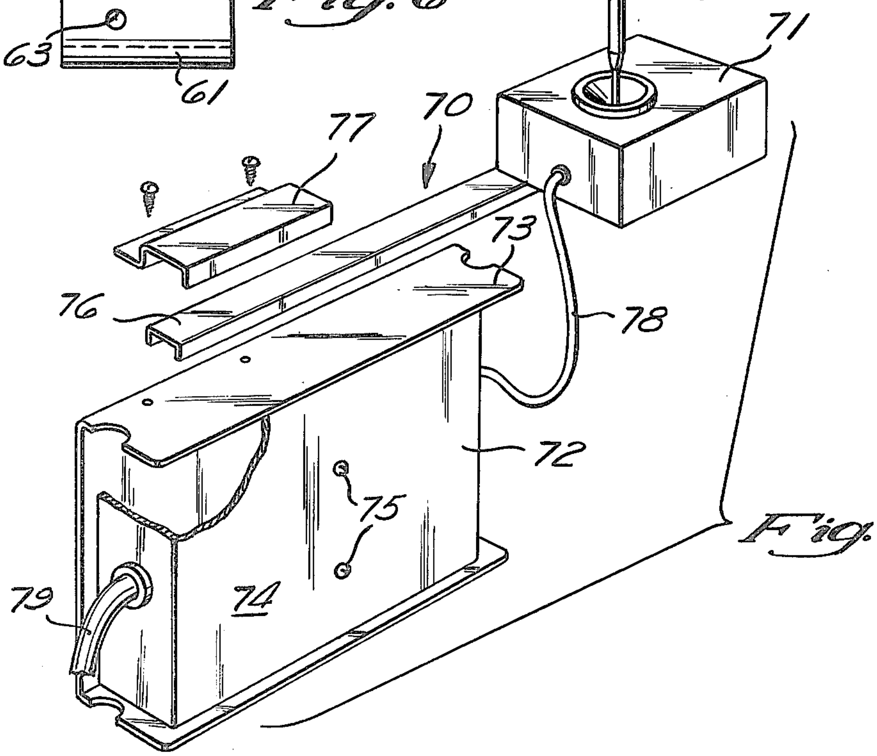
FIG. 7 is an enlarged exploded perspective view of a control unit shown in FIG. 1.

Referring now to FIGS. 1 and 7, the electromechanical drive unit 14 also includes a control device 70 for supplying electric current from the battery 28 to the drive motors 41 of the left and right drive wheel assemblies 39 and 40. The control device 70 includes a joy stick potentiometer 71 which is arranged to control the electrical power provided to the electric motors to steer and propel the electric wheel chair. The control device 70 also includes a components box 72 which houses the other electrical components of the control device 70 and which is constructed of two generally U-shaped flat sheet metal members 73 and 74 which are secured together by suitable threaded fasteners 75. The joy-stick potentiometer 71 is rigidly secured to an elongated channel member 76, and the channel member 76 is slidably secured to the components box 72 by a bracket 77 which is secured to the components box 72 by suitable threaded fasteners. The components box 72 is manually releasably rigidly secured to the right side portion of the collapsible frame 11 by the removable vertical tubular portions of the right arm rest (shown in phantom in FIG. 7). A control cable 78 containing multiple wires insulated from one another electrically connects the potentiometer 71 and the components box 72 while permitting relative movement therebetween when the operator slides the potentiometer 71 to a comfortable operating position. A conduit 79 containing three multiple wire cables 80, 81 and 82 electrically connects the battery 28 to the electric motors 41. The cables 80, 81 and 82 each terminate at a suitable electrical plug (FIG. 1) which is manually releasably connected to the lead wires from the battery 28 and motors 41, respectively.

In order to convert the original collapsible manual wheel chair to the collapsible portable electric wheel chair shown in FIG. 1, the two original large rear wheels of the manual wheel chair (shown in phantom in FIG. 1) are first removed from the rear wheel axle carriers 24. The electromechanical drive unit 14 is then installed in place of the original large rear wheels. This is accomplished by attaching the components box 72 of the control device 70 to the portion of the tubular frame 11 adjacent thereto. The left drive wheel assembly 39 and battery carrier weldment 29 and right drive wheel assembly 40 are then telescopically connected and placed on the ground with the longitudinally extending square tubes 48 of the drive wheel assemblies extending generally vertically upwardly. The frame 11 is manually lifted over the generally vertically extending square tubes 48, and the longitudinally rearwardly extending portions of each side of the frame 11 are telescoped into the square tubes 48. The assembled unit is then rotated approximately 90° clockwise about the wheels 42 when viewed from the right as in FIG. 1 to rotate the longitudinally extending square tubes 48 to a generally horizontal position and to lower the front wheels 12 to the ground. The fastening plates 60 of the drive wheel assemblies are then pushed vertically downwardly over the reinforcing and connecting plates 58 to lock the drive wheel assemblies and the battery carrier weldment on the frame 11 and to reinforce the frame 11 by means of the gusset 59. The battery 28 and vinyl cover 30 are then placed on the battery carrier weldment 29, and the three electrical plugs of the electrical cables 80, 81 and 82 are connected to the lead wires from the battery 28 and the two electric motors 41.

When the converted portable electric wheel chair is to be collapsed, the electrical plugs at the ends of the cables 80, 81 and 82 are first disconnected. The battery 28 and vinyl cover 30 are then lifted from the battery carrier weldment 29. The fastening plates 60 are manually lifted vertically upwardly from the reinforcing and connecting plates 58, and the wheel chair frame 11 is rotated approximately 90° counter clockwise when viewed from the right as in FIG. 1 about the rear wheels 42 to a position in which the longitudinally extending tubes 48 extend generally vertically upwardly. The frame 11 is then lifted vertically upwardly so that the frame 11 is pulled from the tubes 48. The foot rests of the frame 11 are then folded, and the frame 11 is collapsed by folding it about the pivot pin 19 to bring the left and right generally flat side portions of the frame 11 together. Due to the narrow profile or lateral thickness of the components box 72 and potentiometer 71, it is not necessary to remove them from the frame 11. Additionally, because the original large rear wheels of the frame 11 are removed, the size and weight of such rear wheels is eliminated from the collapsed frame of the electric wheel chair. The left and right drive wheel assemblies 39 and 40 are then manually disconnected from one another by manually pulling the tubular members 49 and 50 of each of the drive wheel assemblies laterally outwardly from the tubular members 33 and 34 of the battery carrier weldment 29. This collapsing of the converted portable electric wheel chair is accomplished manually (that is, without the use of tools) in a sufficiently short time (approximately one minute) as to be satisfactory to approximately 100 percent of the users of the converted chair, and the collapsed components of the converted chair are each portable (that is, of a size and weight which will fit in the storage area of an average or subcompact size automobile and which are satisfactory to approximately 100 percent of the users of the converted chair).

What is claimed is:

1. A collapsible portable electric wheel chair comprising a collapsible frame, a collapsible seat on said frame, at least one front wheel on said frame, and a drive unit, said drive unit including a first drive wheel assembly, a second drive wheel assembly, means supplying electric power to each of said drive wheel assemblies for propelling and steering said wheel chair, first fastening means manually releasably securing said first and second drive wheel assemblies to said frame whereby said first and second drive wheel assemblies are manually removable from said frame when said frame is to be collapsed, each of said drive wheel assemblies including an electric motor and a ground engaging drive wheel and means drivingly connecting said electric motor and said ground engaging drive wheel, and second fastening means manually releasably securing said first and second drive wheel assemblies to one another whereby said first and second drive wheel assemblies are manually separable from one another when removed from said frame.

2. A collapsible portable electric wheel chair as set forth in claim 1, wherein said drive unit includes an electric battery and a battery carrier assembly, said battery carrier assembly is disposed between said first and second drive wheel assemblies, and said second fastening means includes said battery carrier assembly.

3. A collapsible portable electric wheel chair as set forth in claim 2, wherein said battery carrier assembly and said battery are disposed between said ground engaging drive wheels of said first and second drive wheel assemblies, and said second fastening means includes means individually releasably securing each of said first and second drive wheel assemblies to said battery carrier assembly.

4. A collapsible portable electric wheel chair as set forth in claim 3, wherein said second fastening means includes telescopic connection means individually telescopically connecting each of said first and second drive wheel assemblies to said battery carrier assembly.

5. A collapsible portable electric wheel chair as set forth in claim 1, wherein said frame includes two longitudinally rearwardly extending substantially horizontal bar members, said longitudinal bar members being laterally spaced apart, and a vertical bar member extending vertically upwardly from each of said horizontal bar members; and said first fastening means includes a tube on each of said first and second drive wheel assemblies telescopically connected to one of said longitudinal bar members, and a locking device on each of said first and second drive wheel assemblies releasably secured to one of said vertical bar members.

6. A collapsible portable electric wheel chair comprising a collapsible frame, a seat on said frame, two ground engaging front wheels on said frame, and a drive unit, said drive unit including a first drive wheel assembly, a second drive wheel assembly, means supplying electric power to each of said drive wheel assemblies for propelling and steering said wheel chair, first fastening means manually releasably securing said first and second drive wheel assemblies to said frame whereby said first and second drive wheel assemblies are manually removable from said frame when said frame is to be collapsed, each of said drive wheel assemblies including an electric motor and a ground engaging drive wheel and means drivingly connecting said electric motor and said ground engaging drive wheel, second fastening means manually releasably securing said first and second drive wheel assemblies to one another whereby said first and second drive wheel assemblies are manually separable from one another when removed from said frame, said means supplying electric power to each of said drive wheel assemblies including a joystick potentiometer and an electrical components box, third fastening means rigidly securing said electrical components box to said frame, and fourth fastening means slidably securing said joystick potentiometer to said electrical components box.

7. A collapsible portable electric wheel chair comprising a collapsible frame, a collapsible seat on said frame, two rotatable front wheels each pivotally mounted on said frame, and a drive unit, said drive unit including a first drive wheel assembly, a second drive wheel assembly, a battery carrier assembly disposed between said first and second drive wheel assemblies, a battery on said battery carrier assembly, and a control device supplying electric power from said battery to each of said drive wheel assemblies for propelling and steering said wheel chair, first fastening means manually releasably securing said first and second drive wheel assemblies to said frame whereby said first and second drive wheel assemblies are manually removable from said frame when said frame is to be collapsed, each of said drive wheel assemblies including an electric motor and a ground engaging rear drive wheel and means drivingly connecting said electric motor and said ground engaging rear drive wheel, and second fastening means manually releasably securing each of said first and second drive wheel assemblies to said battery carrier assembly whereby said first and second drive wheel assemblies are each manually separable from said battery carrier assembly when removed from said frame.

8. A collapsible portable electric wheel chair as set forth in claim 7 wherein said first and second drive wheel assemblies each include adjustable means for moving said electric motor relative to said ground engaging rear drive wheel.

9. A collapsible portable electric wheel chair as set forth in claim 7, wherein said frame includes two longitudinally rearwardly extending substantially horizontal bar members, said longitudinal bar members being laterally spaced apart, and a vertical bar member extending vertically upwardly from each of said horizontal bar members; and said first fastening means includes on each of said first and second drive wheel assemblies a tube telescopically connected to one of said longitudinal bar members and a locking device releasably secured to one of said vertical bar members and a gussett extending between said last mentioned tube and locking device.

10. A collapsible portable electric wheel chair comprising a collapsible frame, a collapsible seat on said frame, two rotatable front wheels each pivotally mounted on said frame, and a drive unit, said drive unit including a first drive wheel assembly, a second drive wheel assembly, a battery carrier assembly disposed between said first and second drive wheel assemblies, a battery on said battery carrier assembly, and a control device supplying electric power from said battery to each of said drive wheel assemblies for propelling ans steering said wheel chair, first fastening means manually releasably securing said first and second drive wheel assemblies to said frame whereby said first and second drive wheel assemblies are manually removable from said frame when said frame is to be collapsed, each of said drive wheel assemblies including an electric motor and a ground engaging rear drive wheel and means drivingly connecting said electric motor and said ground engaging rear drive wheel, and second fastening means manually releasably securing each of said first and second drive wheel assemblies to said battery carrier assembly whereby said first and second drive wheel assemblies are each manually separable from said battery carrier assembly when removed from said frame, said second fastening means includes two laterally extending tubes on said battery carrier assembly and two laterally extending tubes on said first drive wheel assembly and two laterally extending tubes on said second drive wheel assembly, said two tubes on said first drive wheel assembly being telescopically connected to said two laterally extending tubes on said battery carrier assembly, and said two tubes on said second drive wheel assembly being telescopically connected to said two laterally extending tubes on said battery carrier assembly.

11. A method of converting a collapsible portable manual wheel chair to a collapsible portable electric wheel chair comprising the steps of selecting a collapsible portable manual wheel chair having a collapsible portable frame and two small front wheels pivotally mounted on said frame and two large rear wheels mounted on said frame, removing each of said large rear wheels from said frame, and replacing each of said large rear wheels with an electro mechanical drive wheel assembly having a drive wheel and an electric motor and means drivingly connecting said electric motor and drive wheel.

12. A method as set forth in claim 11 wherein said replacing step includes positioning said first and second drive wheel assemblies in a first predetermined position, telescopically securing said frame to said first and second drive wheel assemblies, and rotating said assembled frame and first and second drive wheel assemblies approximately 90 degrees about said drive wheels.

13. A method of converting a collapsible portable manual wheel chair to a collapsible portable electric wheel chair and then collapsing said electric wheel chair comprising the steps of selecting a collapsible portable manual wheel chair having a collapsible portable frame and two small front wheels pivotally mounted on said frame and two large rear wheels mounted on said frame, removing each of said large rear wheels from said frame, replacing each of said large rear wheels with an electromechanical drive wheel assembly having a drive wheel and an electric motor and means drivingly connecting said electric motor and drive wheel, positioning said frame and drive wheel assemblies in a driving position, rotating said frame and drive wheel assemblies approximately 90 degrees about said drive wheels from said driving position to a disassembly position, and removing said frame from said drive wheel assemblies.

14. A method as set forth in claim 13 including the step of releasing said drive wheel assemblies from one another after removing said frame from said drive wheel assemblies.

15. A collapsible portable electric wheel chair comprising a collapsible chair frame, a collapsible non-rigid chair back and a collapsible non-rigid chair seat on said frame, two ground engaging front wheels each pivotally mounted on said frame, and a drive unit, said drive unit including a first drive wheel assembly, a second drive wheel assembly, means supplying electric power to each of said drive wheel assemblies for propelling and steering said wheel chair, fastening means manually releasably securing said first and second drive wheel assemblies to said frame whereby said first and second drive wheel assemblies are manually removable from said frame when said frame is to be collapsed, said fastening means including a tubular member on each of said first and second drive wheel assemblies telescopically connected to said collapsible chair frame, each of said drive wheel assemblies including a support bracket and an electric motor mounted on said support bracket and a ground engaging drive wheel mounted on said support bracket and means drivingly connecting said electric motor and said ground engaging drive wheel, and said tubular member being an integral part of said support bracket.

16. A collapsible portable electric wheel chair as set forth in claim 15, and second fastening means manually releasably securing said first and second drive wheel assemblies to one another whereby said first and second drive wheel assemblies are manually separable from one another when removed from said frame.

17. A collapsible portable electric wheel chair as set forth in claim 16, said second fastening means includes at least one laterally extending tube on each of said support brackets and at least one laterally extending tube on said battery carrier assembly, and at least one of said tubes of said drive wheel assemblies being telescopically connected to said laterally extending tube of said battery carrier assembly.

18. A collapsible portable electric wheel chair as set forth in claim 17, said electric motors each having a longitudinal axis disposed in non-intersecting relation to a vertical plane extending longitudinally through the center of said chair frame.

19. A collapsible portable electric wheel chair comprising a collapsible chair frame, said collapsible chair frame including two rigid longitudinally rearwardly extending substantially horizontal tubes and two rigid substantially vertically extending legs, a collapsible non-rigid chair back and a collapsible non-rigid chair seat on said frame, two ground engaging front wheels each pivotally mounted on said frame, and a drive unit, said drive unit including a battery carrier and a first drive wheel assembly and a second drive wheel assembly, said battery carrier including a laterally extending tube, at least one of said drive wheel assemblies including mounting means and an electric motor on said mounting means and a ground engaging drive wheel on said mounting means and means drivingly connecting electric motor and said ground engaging drive wheel, and said mounting means including a longitudinally extending tube longitudinally telescopically connected to one of said rearwardly extending frame tubes and a laterally extending tube laterally telescopically connected to said battery carrier tube.

20. A collapsible portable electric wheel chair comprising a collapsible chair frame, said collapsible frame having two rigid seat support bars and two rigid back support bars and two rigid leg bars and two rigid longitudinally rearwardly extending subtantially horizontal bars, a collapsible non-rigid chair back and a collapsible non-rigid chair seat on said frame, two ground engaging front wheels each pivotally mounted on said frame, and a drive unit, said drive unit including a first drive wheel assembly, a second drive wheel assembly, means supplying electric power to each of said drive wheel assemblies for propelling and steering said wheel chair, fastening means manually releasably securing said first and second drive wheel assemblies to said frame whereby said first and second drive wheel assemblies are manually removable from said frame when said frame is to be collapsed, said fastening means including a tubular member on each of said first and second drive wheel assemblies telescopically connected to one of said rearwardly extending bars, and each of said drive wheel assemblies including an electric motor and a ground engaging drive wheel and means drivingly connecting said electric motor and said ground engaging drive wheel.

* * * * *